United States Patent

Gmuer et al.

[11] Patent Number: 5,579,954
[45] Date of Patent: Dec. 3, 1996

[54] MICRO-METERING DEVICE

[75] Inventors: Bruno Gmuer, St. Gallen; Peter Naef, Heiden, both of Switzerland

[73] Assignee: Buehler AG, Switzerland

[21] Appl. No.: 467,606

[22] Filed: Jun. 6, 1995

Related U.S. Application Data

[62] Division of Ser. No. 350,670, Dec. 7, 1994, Pat. No. 5,497,907, which is a continuation of Ser. No. 98,218, Jul. 28, 1993, abandoned, which is a continuation of Ser. No. 768,816, Sep. 30, 1991, abandoned, which is a continuation-in-part of Ser. No. 679,061, May 23, 1991, abandoned.

[30] Foreign Application Priority Data

Oct. 9, 1989 [CH] Switzerland ............... 3674/89
Oct. 2, 1990 [HU] Hungary ............... 76 16/90
Oct. 10, 1990 [WO] WIPO ............... PCT/CH90/00233

[51] Int. Cl.⁶ ............... B67D 5/08
[52] U.S. Cl. ............... 222/58; 222/145.6; 222/145.7; 222/145.8; 222/241
[58] Field of Search ............... 222/58, 77, 145.5–145.8, 222/227, 236, 239, 241

[56] References Cited

U.S. PATENT DOCUMENTS

| | | | |
|---|---|---|---|
| 2,509,431 | 5/1950 | Hall et al. | 222/195 |
| 2,544,210 | 3/1951 | Zenke et al. | 222/77 |
| 2,623,658 | 12/1952 | Johansen | 222/145.7 X |
| 2,884,230 | 4/1959 | Pyle et al. | 222/195 |
| 3,115,276 | 12/1963 | Johanningmeier | 222/145.6 X |
| 3,133,675 | 5/1964 | Broadhurst | 222/145.6 X |
| 3,151,782 | 10/1964 | Wahl | 222/227 |
| 3,174,651 | 3/1965 | Strite | 222/145.7 X |
| 3,193,155 | 7/1965 | Hazen | 222/227 |
| 3,215,314 | 11/1965 | Haley | 222/145.6 X |
| 3,602,380 | 8/1971 | Spencer | 222/238 |
| 4,182,386 | 1/1980 | Alack | 222/195 |
| 4,222,498 | 9/1980 | Brock | 222/58 |
| 4,320,855 | 3/1982 | Ricciardi et al. | 222/58 |
| 4,740,128 | 4/1988 | Foresman et al. | 222/238 |
| 4,762,252 | 8/1988 | Hyer et al. | 222/56 |
| 5,103,401 | 4/1992 | Johnson | 222/58 |
| 5,127,450 | 7/1992 | Saatkamp | 222/145.6 X |

FOREIGN PATENT DOCUMENTS

| | | | |
|---|---|---|---|
| 627902 | 11/1961 | Italy | 222/77 |
| 48132 | 4/1980 | Japan | 222/58 |
| 61-18642 | 1/1986 | Japan | 222/236 |
| 547914 | 9/1942 | United Kingdom | 222/227 |
| 820155 | 9/1959 | United Kingdom | 222/145.7 |

*Primary Examiner*—Andres Kashnikow
*Assistant Examiner*—Kenneth Bomberg
*Attorney, Agent, or Firm*—Finnegan, Henderson, Farabow, Garrett & Dunner, L.L.P.

[57] ABSTRACT

The new invention is directed to a metering device (1) which can be constructed as a differential weigher. The product is stored in a weighing-container (2) which is possibly cylindrical and comprises a flat base (15, 18). A uniform product feed is ensured by means of a cleaning device (13, 19) acting in two horizontal planes, wherein a relief base (15) with fall-through opening (16) is preferably arranged between the two planes in such a way that a pre-metering space (17) is formed in the lower part of the weighing container. The product is conveyed out of the pre-metering space (17) through the lower cleaning device (19) to the metering screw (4) and discharged in a metered manner by the latter by means of controllable speed.

10 Claims, 5 Drawing Sheets

MICRO-METERING DEVICE

CROSS-REFERENCE TO RELATED APPLICATIONS

This application is a divisional of application Ser. No. 08/350,670, filed Dec. 7, 1994, now U.S. Pat. No. 5,497,907, which is a continuation of application Ser. No. 08/098,218, filed Jul. 28, 1993, now abandoned, which is a continuation of U.S. application Ser. No. 07/768,816, filed Sep. 30, 1991, now abandoned, which in turn is a continuation-in-part application of U.S. Ser. No. 08/679,961, filed May 23, 1991, now abandoned, which is based on PCT/CH90/00233, filed on Oct. 2, 1990, which is based on Swiss application no. 3674/89-4 filed on Oct. 9, 1989.

BACKGROUND OF THE INVENTION

1. Field of the Invention

The invention is directed to a micro-metering device for the volumetric or gravimetric continuous delivery of bulk materials which comprises a bulk material container, discharge means and a metering screw.

In this connection, bulk materials can be divided into three main groups:

- bulk materials having light flow properties are those which can flow freely without auxiliary means through a base opening having a diameter of five times the largest kernel size, e.g. granulate, cereals, etc.
- bulk materials having heavy flow properties which build bridges over the outlet opening, e.g. the most flour-like, i.e. fine-grained products. A greater discharge surface must be utilized with these products.
- bulk materials having medium flow properties which are assigned to one of the first two groups depending on the physical conditions, e.g. moisture, storage time, etc.

2. Discussion of Related Art

In the preparation of foodstuffs and feedstuffs, it is often necessary to mix together mixture components in relatively small quantities or to mix in a small percentage of additives in larger batches. For example, this is the case with soups and seasoning mixtures or in the production of feed mixtures, also, e.g., in the metered addition of flour to semolina in pasta production.

In automatic operations, it is required in every case that the components be combined in volumes or weight proportions which can be exactly determined. Industrial practice demands that operation be as trouble-free as possible.

Known problems of pouring with sugar and salt shakers should be avoided in automatic operations. Two methods are available for avoiding these problems. First, the product to be metered is put into a form such that the material always remains in a virtually pourable state, i.e. always retains light flow properties. This often requires additional treatments such as drying or the production of a special granulation or a powder form which generally amounts to an increase in the cost of the raw material.

The second method consists in making all metering devices more complicated, so that stoppage and bridging are both impossible.

U.S. Pat. No. 3,151,782 discloses a solution which is widespread in various fields, particularly for chemical materials. A common drive ensures both the product feed from a reservoir and the exact metering or movement of a metering screw. The feed from the reservoir is produced by means of a shaking movement, wherein the material is prevented from shooting through the base opening by means of a cover plate over the opening. However, many materials, particularly foodstuffs or feedstuffs, tend to cake together when vibrated, so that the vibrations are not a genuine metering means in this instance. On the contrary, operating reliability is jeopardized by the shaking.

SUMMARY OF THE INVENTION

The invention has as a primary object the provision of a metering device which is simple with respect to construction and operates in a reliable and accurate manner and is particularly suitable for automatic installations for bulk materials with light, medium and heavy flow properties.

The metering device for the continuous delivery of bulk materials comprises a container with discharge means as well as a metering screw and is characterized, according to the invention, in that the metering device, in a modular construction consisting of a discharge part comprising a round discharge housing and a metering part in the form of a volume metering element, is assembled to form a structural component group.

A number of unexpected advantageous constructions result. First, the reservoir opens into a round outlet cross section of an order of magnitude which excludes the formation of bridges. In such arrangement, depending on the flow behavior, the reservoir is an outlet sifter, a vertical cylinder or, when the product has extremely light flowing properties, a negative cone having a cross section which widens from the top downward. Second, the reservoir opens into a blade-type discharge system. Such discharge system ensures a product discharge along the entire discharge cross section and accordingly ensures an ideal mass flow. Third, the screw metering system is arranged in such a way that the product feed is effected so as to be loaded by pressure, and the product feed is activated immediately via the screw by means of the discharge element, so that no product bridges can be formed along the screw. Fourth, the discharge part and metering part are modular constructions, i.e., construction parts which can be assembled, each being designed and being able to be combined as desired corresponding to the product flow and the lengthened line.

Practical tests have confirmed that the stated object of the present invention could be met in a surprisingly favorable manner in every respect. It has been shown that the new metering device is much less dependent than the known solutions.

In metering devices, a reel-like rotating element is often arranged in the lower area of the weighing container for the benefit of the product flow and for loosening the product. In many cases, pulse-like movements on the product cannot be avoided. The vertically acting component of the mechanical pulsing undermines the accuracy of the weighing.

Due to this reel mechanism, the product activation in the discharge area is arbitrarily a uniform product removal on the discharge surface, and a mass flow is not achieved.

On the other hand, the horizontally moved cleaning device has no disadvantageous effect on the weighing results. The flat bottomed construction permits an optimal construction form as a simple vertical cylinder. The cylindrical construction form is ideal for the majority of bulk materials, particularly in the area of the foodstuffs industry.

The pressureless arrangement of the metering screw feed ensures that the metering screw takes over the product with constant feed conditions, which is particularly important with products which are compressed under pressure, i.e. products which vary in bulk weight.

The invention is further directed to a number of particularly advantageous constructions.

Thus, it is suggested that the product transfer opening from the weighing container to the metering screw be constructed as a pressureless expansion space.

In a particularly preferred manner, the cleaning device is constructed as a double-armed cleaning device acting on two planes; a relief base can be arranged between the two cleaner arms.

Tests have confirmed that a uniform metering with high accuracy can be achieved in this manner even with bulk materials having heavy flow properties.

The cleaning device and metering screw advantageously comprise a common drive, so that the speed and outputs, respectively, of both arched parts can change in a parallel manner when the output is regulated.

As a result of the selected modular construction, a plurality of constructions which are independent of the output product can be assembled to form the most suitable device block.

Another advantageous idea consists in that the weighing container is constructed as a closed container comprising a product feed opening as well as an air lock. The air lock is constructed so as to be controllable for aerating and ventilating the weighing container, as desired. In the cycle of filling and emptying the weighing container, the air pressure conditions are regulated in order to prevent corresponding disturbances in the weighing results; it is regulated with a view to keeping the installation clean when filling on the one hand, and with a view to keeping the air pressure constant when emptying on the other hand.

The metering device is advantageously utilized as a variable-speed volume metering device, as a micro-metering device for differential weighers for small outputs, and as a metering device for a smaller weigher.

BRIEF DESCRIPTION OF THE DRAWINGS

The invention is described in more detail in the following with respect to different embodiment examples.

DESCRIPTION OF THE PREFERRED EMBODIMENTS AND BEST MODE

Figure 2:
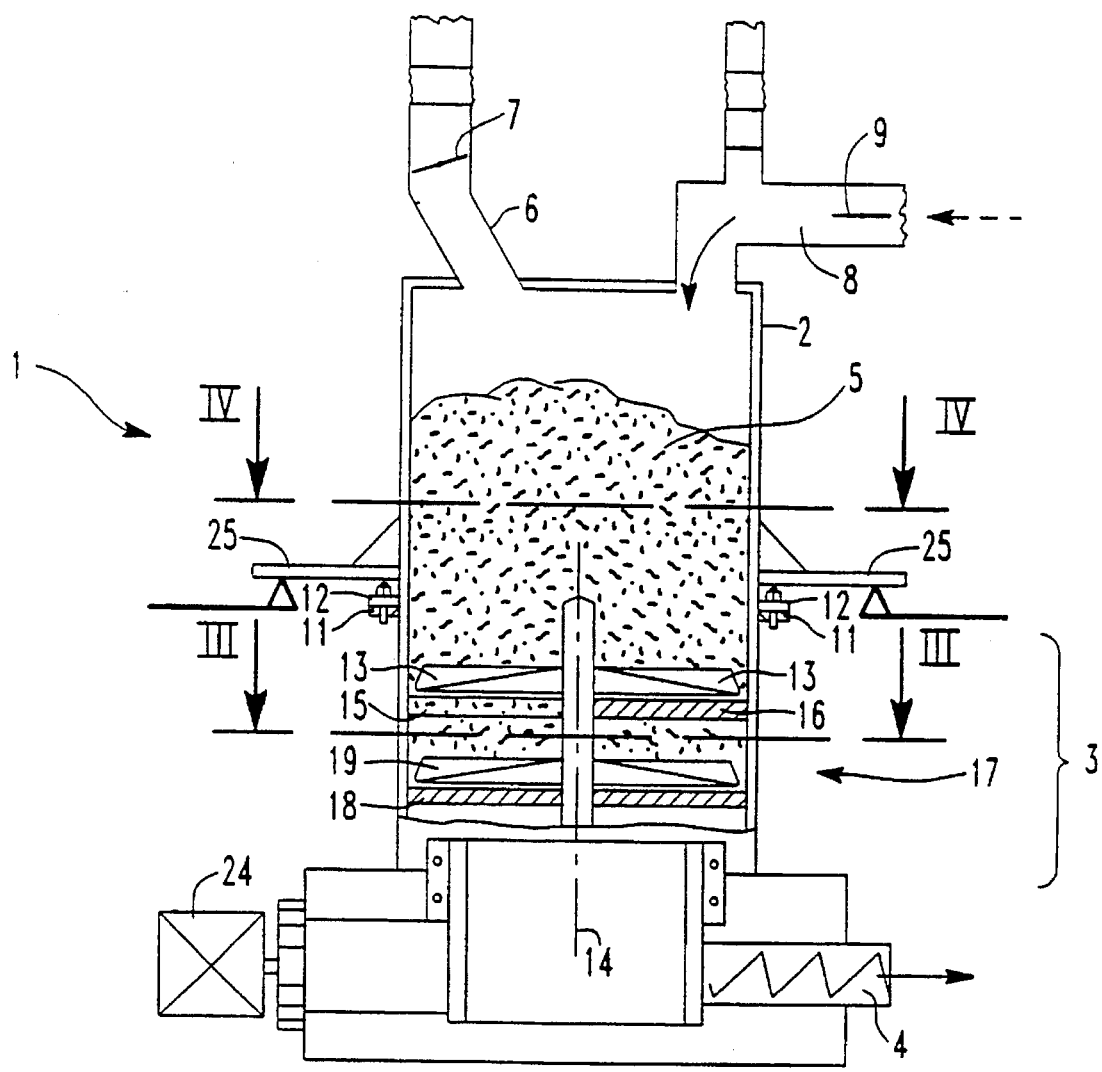
FIG. 2 shows a view of FIG. 1 together with a section through the weighing container.
Figure 3:
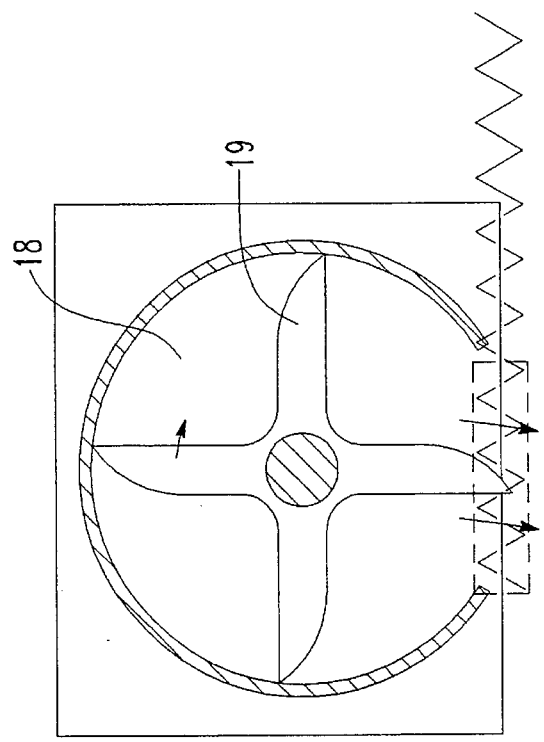
FIG. 3 shows a section III—III of FIG. 2.

FIG. 2 is referred to in the following. The entire unit is constructed as a metering weigher 1 which comprises a weighing container 2 with discharge means 2, as well as a metering screw 4. The product 5 is fed via a feed spout 6 which can be closed by means of a slide 7. By means of an air lock 8, room air can be admitted via an opening which can be closed by a flap 9 or, when the flap 9 is closed during the filling of the weighing container 2, dust-containing air can be aspirated.

Figure 1:
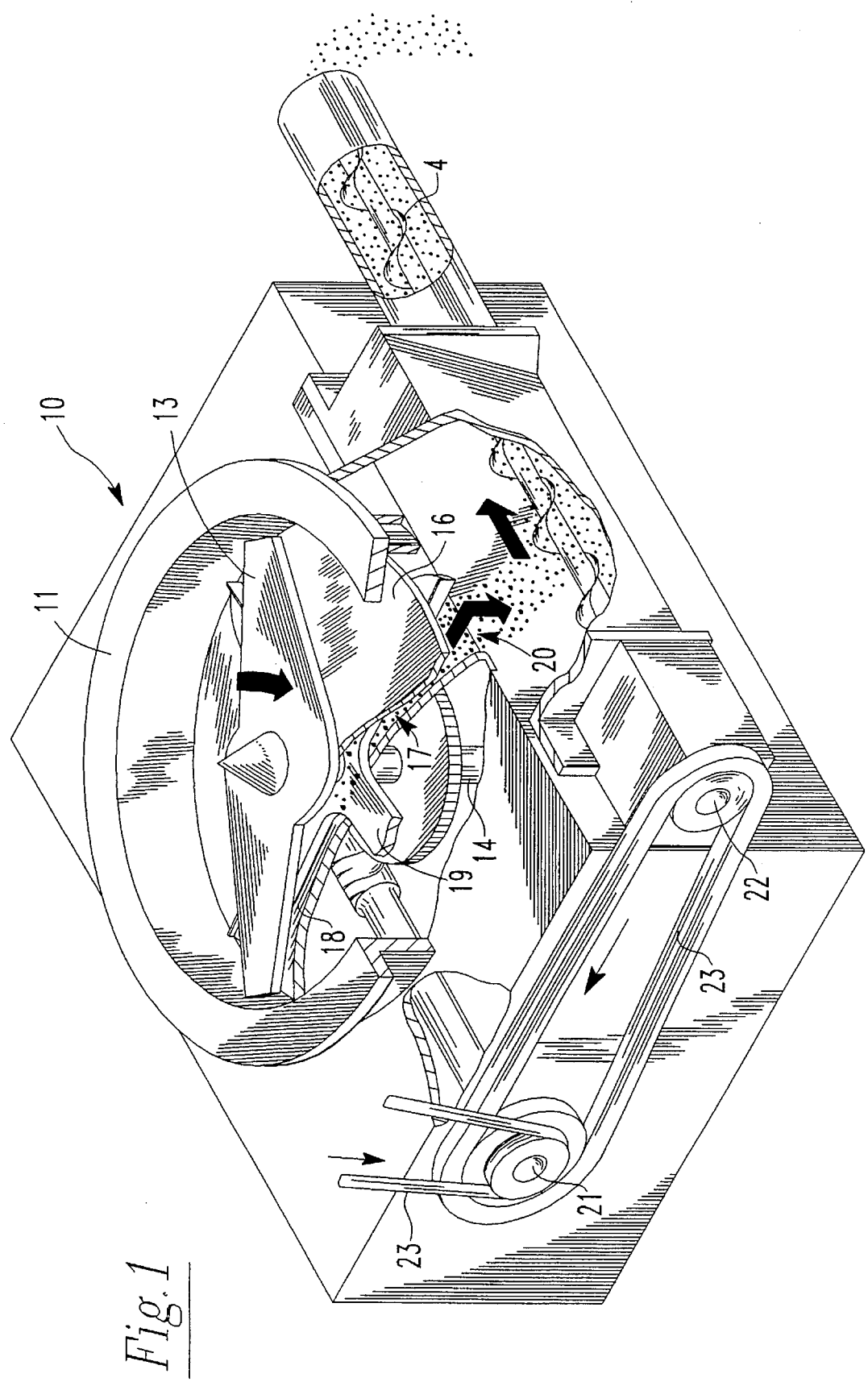
FIG. 1 shows a perspective view of the central elements of the base portion of the micro-metering device.
Figure 4:
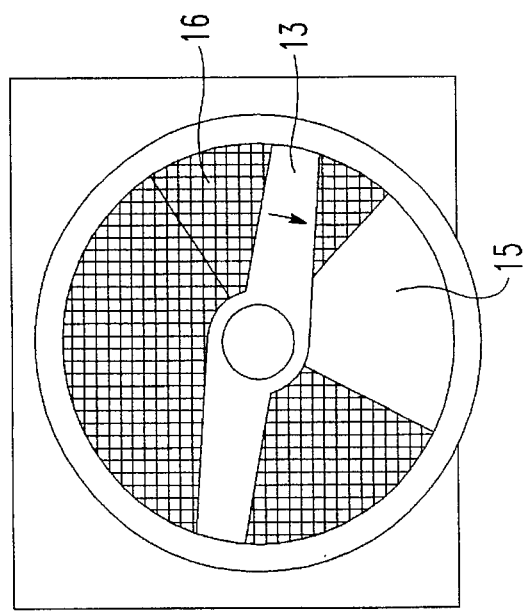
FIG. 4 shows a section IV—IV of FIG. 2.
Figure 5:
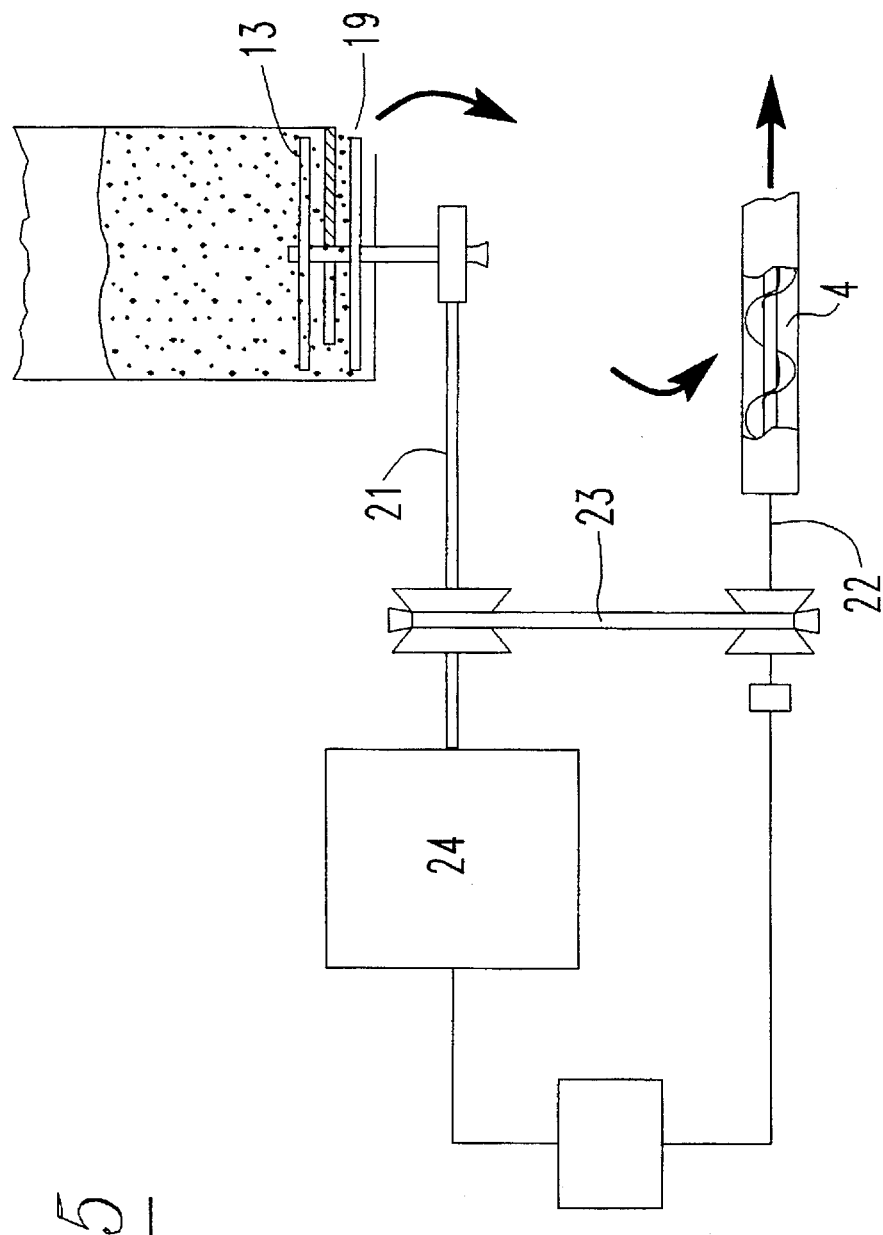
FIG. 5 shows a schematic view of the drive of the micro-metering device.

FIG. 1 shows the lower part of the entire device, partly in section, designed as a block unit 10. The block unit is defined at the top by a fastening flange 11 which is screwed together with a corresponding flange 12 of the weighing container 2 or, in the case of frequently changing products, is connected with quick closures. The discharge means 3 comprises a two-blade cleaning device 13 which is driven via a vertical axle 14. The cleaning device 13 moves at a slight distance directly above a relief base 16 which is arranged substantially horizontally. The relief base 16 is presented in outline in FIG. 4 with horizontal and vertical hatching, and is shown to comprise a sector-shaped product fall-through opening 15. The cleaning device 13 conveys the product into a pre-metering space 17 between an actual base 18 and the relief base 16; a second cleaning device 19 for the actual discharge from the pre-metering space 17 into the feed area 20 of the metering screw 4 acts above the base 18.

The product is fed to the metering screw so as to be uniformly relieved of pressure because the inlet into the metering screw is arranged in the areas of the base sector covered by the relief base 16. The product is delivered in this way, preferably in two steps, from the weighing container 2 through the metering screw.

The second cleaning device 19 has the actual discharge function and the installation of the product transfer to the screw inlet; the cover plate (relief base) relieves the screw inlet of variable pressures, since the variously high product column, the cleaning device 13 reinforces the product discharge in the area of the cover plate.

The cleaning devices 13 and 19, as well as the metering screw 4, are driven via two parallel drive axles 21 and 22, respectively, and by a belt transmission 23, and a common drive 24. The drive 24 can be constructed as a remote-controlled variable-speed gear unit. In the majority of cases, it is sufficient if the drive axles 21 and 22, respectively, have a predetermined speed ratio. The two speeds are changed correspondingly when the metering output is increased or reduced.

The entire metering unit is suspended and supported, respectively, at weighing elements 25. The weighing elements indicate a gross weight including all mechanical elements as well as all product supported in the weighing container and including the product which is located on the way to the metering screw 4 and in the metering screw 4. The metering weigher 1 works as a differential weigher. The weighing container 2 is periodically filled. After filling, the exact metering output can be deduced based on the reduction in weight by means of subtracting the weight values, or the exact metering output can be determined and controlled by means of weight reduction calculated beforehand. The weighing container 2 is aspirated only during filling, but communicates with the surrounding air pressure during emptying, so that no fluctuations in air pressure disturb the weight indications. During trouble-free operation, the exact speed of the metering screw can be determined for a predetermined metering output. This speed can then be left constant during the filling of the weighing container or can be preselected again for an identical metering task and subsequently compared to the differential weighing value.

Figure 6:
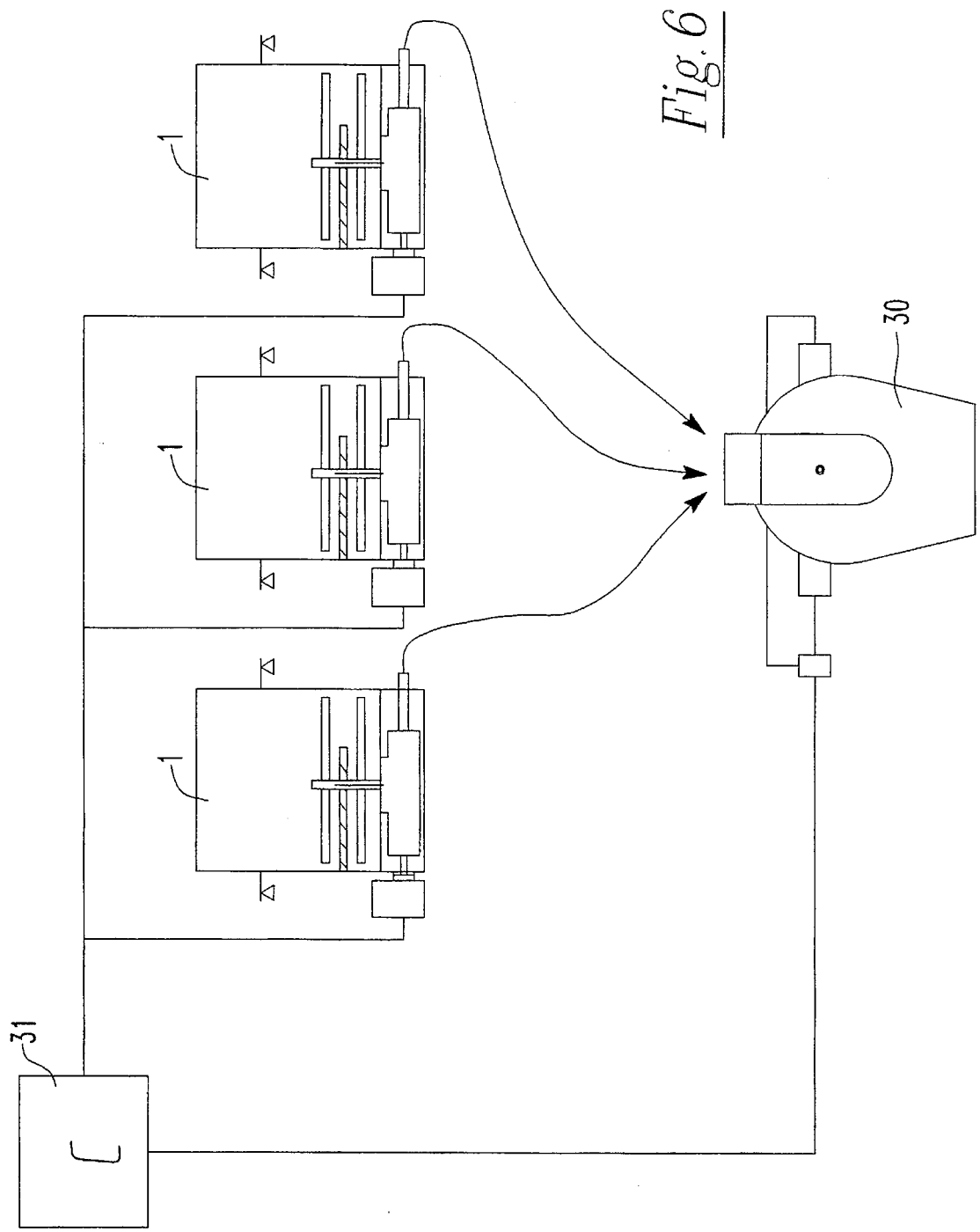
FIG. 6 shows an entire micro-metering group.

In many metering tasks, a plurality of different products must be fed to a common mixing weigher 30, as is shown in FIG. 6 as an embodiment example. The latter shows three metering weighers 1 which are controlled by a common computer 31. The individual metering is taken over by the common mixing weigher 30.

While the foregoing description and drawings represent the preferred embodiments of the present invention, it will be obvious to those skilled in the art that various changes and modifications may be made therein without departing from the true spirit and scope of the present invention.

We claim:

1. A micro-metering station for continuous and accurate delivery of small amounts of different bulk materials comprising:

a plurality of micro-metering apparatuses, each apparatus comprising,
   (i) a weighing container;
   (ii) discharge means connected to the weighing container and having a rotating cleaning means disposed therein to move the bulk material through the discharge means,
   (iii) a metering screw device connected to the discharge means for receiving bulk material from the discharge means and for delivering a metered amount of the bulk material;
   a common mixing weigher for receiving the metered amount of the bulk materials;
   weighing elements connected to each one of the plurality of the weighing containers to provide continuous signals representative of the weight of each one of the micro-metering apparatuses and the bulk material; and
   control means responsive to the continuous signals and operatively connected to the plurality of micro-metering apparatuses for controlling the delivery of bulk material to the common mixing weigher,
   wherein the discharge means further comprises:
   an upper horizontal base having an opening therein, the opening being substantially unimpeded for a flow of bulk material from the weighing container; and
   a lower horizontal base vertically spaced from the upper base to define a premetering space therebetween, the premetering space being in flow communication with the weighing container through the opening in the upper horizontal base and having the rotating cleaning means therein, wherein said metering screw device is in flow communication with the premetering space through an aperture.

2. The micro-metering station of claim 1 wherein the opening in the upper horizontal base of the discharge means is sector shaped.

3. The micro-metering station of claim 1 wherein the opening in the upper horizontal base of the discharge means is laterally disposed opposite the aperture thereby preventing the bulk material from surging into the metering screw device.

4. The micro-metering station of claim 3, wherein the premetering space is further defined by a side wall extending between the upper and lower horizontal bases and where the aperture is located in the side wall.

5. The micro-metering station of claim 1 further comprising a rotating cleaning device above the upper horizontal base for transferring bulk material through the opening in the upper horizontal base, and wherein the two rotating cleaning devices and the metering screw are driven by a single drive means.

6. The micro-metering station of claim 5 wherein the rotating cleaning device above the upper horizontal base has a two-blade construction.

7. The micro-metering station of claim 1 wherein the rotating cleaning device in the premetering space of the discharge means has a four-blade construction.

8. The micro-metering station of claim 1 wherein the weighing container includes an air lock for ventilating and aerating the weighing container during filling.

9. The micro-metering station of claim 1 wherein the control means is a computer.

10. A micro-metering station for continuous and accurate delivery of small amounts of different bulk materials comprising:

a plurality of micro-metering apparatuses, each apparatus comprising,
    a weighing container;
    a discharge assembly connected to the weighing container and having
    (i) an upper horizontal base having an opening therein, the opening being substantially unimpeded for a flow of bulk material from the weighing container;
    (ii) a chamber including a lower horizontal base vertically spaced from the upper base to define a premetering space, the premetering space being in flow communication with the weighing container through the opening in the upper horizontal
    (iii) an aperture located in said chamber being in flow communication with the premetering space;
    (iv) a rotating cleaning device disposed in said discharge assembly for transferring bulk material through the aperture; and
    (v) a metering screw device disposed to receive bulk material from said aperture and to deliver a metered amount of the bulk material to an output of the discharge assembly;
    a common mixing weigher for receiving the metered amount of the bulk materials;
    weighing elements connected to each one of the plurality of the weighing containers to provide continuous signals representative of the weight of each one of the micro-metering apparatuses and the bulk material; and
    control means responsive to the continuous signals and operatively connected to the plurality of micro-metering apparatuses for controlling the delivery of bulk material to the common mixing weigher.

* * * * *

UNITED STATES PATENT AND TRADEMARK OFFICE
CERTIFICATE OF CORRECTION

PATENT NO. : 5,579,954
DATED : December 3, 1996
INVENTOR(S) : Bruno GMUER et al.

It is certified that error appears in the above-indentified patent and that said Letters Patent is hereby corrected as shown below:

Claim 10, column 6, line 34, after "horizontal" insert --base;--

Signed and Sealed this

Fourth Day of March, 1997

Attest:

BRUCE LEHMAN

Attesting Officer

Commissioner of Patents and Trademarks